FIP8102 XR 3,195,047 S REFERENCE SEARCH ROOM

July 13, 1965 C. L. RUTHROFF 3,195,047

FREQUENCY MODULATION COMMUNICATION SYSTEM HAVING AUTOMATIC FREQUENCY DEVIATION ADJUSTING MEANS

Filed Dec. 29, 1961 2 Sheets-Sheet 1

INVENTOR
C. L. RUTHROFF
BY [signature]
ATTORNEY

INVENTOR
C. L. RUTHROFF
BY [signature]
ATTORNEY

United States Patent Office 3,195,047 Patented July 13, 1965

3,195,047
FREQUENCY MODULATION COMMUNICATION SYSTEM HAVING AUTOMATIC FREQUENCY DEVIATION ADJUSTING MEANS

Clyde L. Ruthroff, Fair Haven, N.J., assignor to Bell Telephone Laboratories, Incorporated, New York, N.Y., a corporation of New York Filed Dec. 29, 1961, Ser. No. 163,262
4 Claims. (Cl. 325—46)

This invention relates to communication systems and, more particularly, to control circuitry for bringing about an improvement in the quality of transmission of a frequency modulation communication system.

It is known that as the frequency swing or deviation of a frequency modulated signal conveying information between communication stations is increased, the signal-to-thermal noise ratio of the demodulated signal at the receiver output also increases. At the same time, as the frequency deviation is increased, the modulation noise, i.e., intermodulation distortion, of the system increases, and hence the signal-to-modulation noise ratio of the signal appearing at the receiver output decreases. In a number of systems as for example systems carrying many multiplexed voice channels, modulation noise takes on the characteristics of thermal noise and the two are treated alike in evaluation of the system performance. There is a frequency deviation for the particular operating conditions of any system, occurring when the thermal noise and modulation noise are equal, that results in maximum overall signal-to-noise, i.e., signal-to-thermal noise plus modulation noise, ratio at the receiver output. In other words, by setting the frequency deviation at the transmitter to satisfy this criterion, transmission can be carried on with the highest quality, i.e., largest signal-to-total noise ratio, possible for the particular operating conditions and system design.

In a large number of communication systems, the intensity of the carrier intercepted at the receiver and applied to the receiver input can be expected to vary from time to time due to changes in transmission path loss between stations. The multipath transmission phenomenon which inevitably occurs in ionospheric transmission due to variations in the conditions of the ionosphere is one such cause of changing path loss. Rain and other weather processes causing alterations in atmospheric conditions also give rise to changes of carrier intensity at the receiver input. Path loss variations are perhaps most pronounced in communication systems in which the stations themselves are subject to physical changes in position with respect to one another. Among such systems number mobile radio communication systems and satellite communication systems, where an orbiting satellite repeater links ground terminal stations.

In a frequency modulation system, changes in carrier intensity at the receiver input, of course, do not affect the signal intensity at the receiver output, but they do affect the noise at the receiver output. In fact, as the signal intensity at the receiver input fades, the thermal noise appearing at the receiver output increases. Thus, in frequency modulation systems subject to changes in path loss, optimum quality of transmission can not be maintained by setting the frequency deviation according to the above-stated criterion, because a change in the carrier intensity at the receiver input thereafter upsets the balance between thermal noise and modulation noise. Optimum quality of transmission then takes place at a different frequency deviation meeting the above-stated criterion for the new conditions.

It is, therefore, the object of the present invention to maintain optmium quality of transmission in a frequency modulation communication system despite variations in path loss between the transmitter and the receiver.

In accordance with the above object, the frequency deviation of the modulated signal of frequency modulation system is automatically adjusted at the transmitter to maintain optmium quality of transmission as the intensity of the signal intercepted and applied to the receiver input changes. This is achieved in general by deriving an indication of the intensity of the carrier intercepted at the receiver input and transmitting this indication to the transmitter where a control signal is produced which adjusts the frequency deviation of the modulated carrier to be transmitted to the receiver.

At the receiver the intensity of the demodulated signal applied to the receiver output is adjusted in inverse relationship to the changes in frequency deviation introduced at the transmitter to compensate for changes in signal intensity which would otherwise occur at the receiver output.

In the special type system in which changes in path loss between the transmitter and receiver are predictable, e.g., satellite communications, the control signal for adjusting the frequency deviation is derived from a source of information, e.g., the satellite orbit parameters, located right at the transmitter.

The above and other features of the invention will be considered in detail in the following specification taken in conjunction with the drawings in which.

Figure 1:
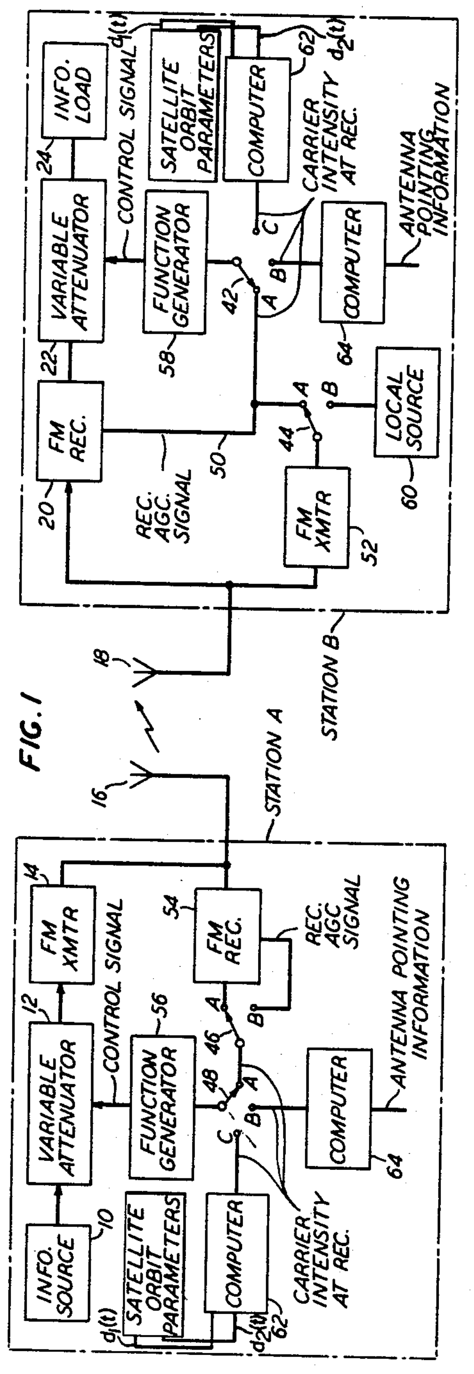
FIG. 1 is a schematic diagram in block form of a communication system illustrating the principles of the invention.

FIG. 1 illustrates a frequency modulation system embodying a station A and a station B, remotely located from station A, the radio frequency path loss between stations being subject to variations due to one reason or another. The principal transmitting equipment at station A comprises an information source 10 the information of which is applied to a variable attenuator 12, controlled externally to maintain optimum quality of transmission by means to be considered in detail hereinafter, and then to a frequency modulation transmitter 14 in preparation for transmission to station B from an antenna 16. Variable attenuator 12 could be, by way of example, a varistor having a variable bias or a potentiometer driven by a motor. At any rate, variable attenuator 12 subjects the output of source 10 to variations in intensity depending upon the magnitude of the applied control signal to provide suitable adjustments of the frequency deviation of the transmitted signal. At station B the signal is intercepted by an antenna 18 and applied to conventional receiver equipment comprising a frequency modulation receiver 20, a variable attenuator 22, and an information load 24 connected in tandem, in the order recited. The demodulated information signal emanating from receiver 20 is subjected by variable attenuator 22 to changes in intensity, opposite to the changes introduced by attenuator 12, prior to application to load 24. The intensity of the signal applied to load 24 is thus left unaffected by the activity of attenuator 12.

Figure 2:
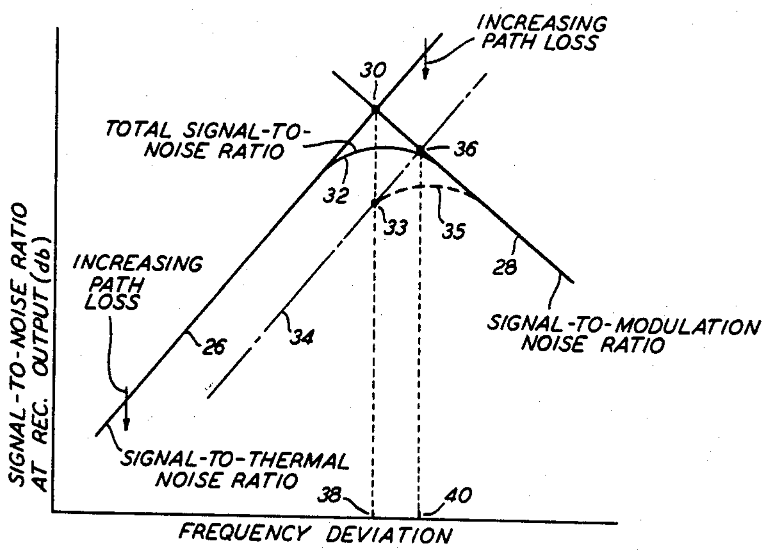
FIG. 2 is a graph that is helpful in comprehension of the invention.

It is known that the signal-to-thermal noise ratio at a receiver output, designated load 24 in FIG. 1, is directly proportional to the square of the frequency deviation of the frequency modulated signal applied to the receiver input. This relationship is represented by curve 26 in FIG. 2. It is also well known that the modulation noise generated during transmission through a communication system is directly proportional to a power, usually the square or cube, of the frequency deviation of the frequency modulated signal traversing the system. Therefore, the signal-to-modulation noise ratio at a receiver output is inversely proportional to the square of the frequency deviation. This is indicated by curve 28 in FIG. 2. For a particular set of operating conditions there is a value of frequency deviation at which the thermal noise and modulation noise are equal, shown as occurring at a point 30 in FIG. 2. It is at point 30, corresponding to a frequency deviation at a point 38 on the abscissa of the graph, that the total signal-to-noise ratio, i.e., the ratio of signal-to-thermal noise plus modulation noise, at the receiver output, represented by curve 32, is of maximum value and optimum quality of transmission for the system design occurs.

However, when the intensity of the carrier intercepted at the receiver input decreases from the value of the carrier intensity of the above case due to an increase in path loss between the transmitter and receiver, the signal-to-thermal noise ratio assumes a new, lower value represented by the shift downward to a curve 34. From observation of FIG. 2 it is evident that the criterion of optimum quality of transmission, equal thermal noise and modulation noise, now is satisfied at a point 36, corresponding to a different frequency deviation at a point 40 on the abscissa of the graph. Moreover, the existing frequency deviation at point 38 results in a total signal-to-noise ratio at the receiver output, at a point 33 on a curve 35, well below the maximum possible signal-to-noise ratio for the system design and operating conditions. The invention provides control circuitry for adjusting the frequency deviation of the frequency modulated signal to assume the value which results in optimum quality of transmission as the path loss between transmitter and receiver, and hence carrier intensity at the receiver input, changes.

One embodiment of the invention, having general applicability, is operative when switches 46 and 48, located at station A in FIG. 1, and switches 42 and 44, located at station B, are all in the position designated "A." A signal representative of the intensity of the carrier intercepted by antenna 18 and applied to frequency modulation receiver 20 is developed at station B. A portion of the control signal employed in an existing forward acting automatic gain control loop in receiver 20 could be employed for this purpose. The carrier-intensity-representative signal is applied on a lead 50 through switch 44 to a frequency modulation transmitter 52 prepared for transmission to station A from antenna 18. This signal is intercepted by antenna 16 at station A, demodulated in a frequency modulation receiver 54, and applied through switches 46 and 48 to a function generator 56. Function generator 56 produces a control voltage from the carrier-intensity-representative signal which is applied to variable attenuator 12 to vary the intensity of the information signal emanating from source 10 prior to application to frequency modulation transmitter 14 in accordance with the changes in carrier intensity at station B. Thus, the frequency deviation of the frequency modulated signal carrying information from station A to station B is continuously and automatically adjusted to maintain optimum quality of transmission.

Figure 3A:
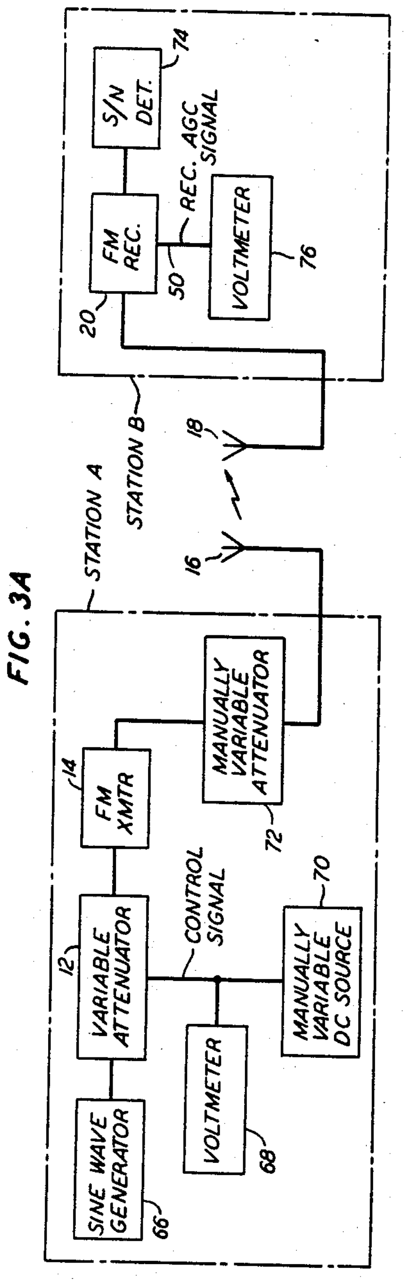
FIG. 3A is a block schematic diagram of a circuit arrangement for determining the relationship between frequency deviation of the frequency modulated signal and the carrier intensity at the receiver.
Figure 3B:
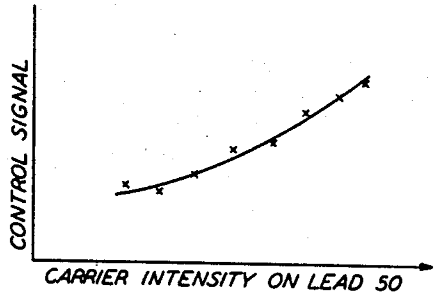
FIG. 3B is a graph plotting a typical function determined by the circuit arrangement of FIG. 3A.

The function to be produced by function generator 56 can be determined empirically for any given system prior to connection of the control circuitry through the use of the circuit arrangement of FIG. 3A according to the following procedure. The carrier intensity appearing on lead 50 at station B is made to vary over the entire range of values expected in actual operation by manually varying an attenuator 72 located between transmitter 14 and antenna 16 at station A. A direct-current source 70 having a manual magnitude adjustment is applied as the control signal to variable attenuator 12 to control the output intensity from a sine wave generator 66. For each one of a range of values of carrier intensity appearing on lead 50 at station B, indicated by a voltmeter 76, source 70 is adjusted for maximum total signal-to-noise ratio indication on detector 74 at the output of receiver 20. The values of control signal, indicated by a voltmeter 68, producing maximum total signal-to-noise ratio at the receiver output are plotted on the ordinate of a graph against the corresponding values of carrier intensity on lead 50 on the abscissa, as illustrated by FIG. 3B. A mathematical expression for the control signal as a function of carrier intensity at receiver 20, approximating the empirical function plotted, can be synthesized by well-known techniques. This mathematical expression can then be implemented from conventional analog computer circuitry to form function generator 56.

At the same time, the portion of the automatic gain control signal abstracted from receiver 20 is also applied on lead 50 through switch 42 to a function generator 58 which derives a control signal for adjustment of variable attenuator 22 in inverse or opposite relation to the adjustments made upon variable attenuator 12. Function generator 58 is implemented to provide exactly the reciprocal function of generator 56. In this way, the intensity of the information applied to load 24 is maintained constant while the frequency deviation of the modulated signal is adjusted at station A.

An alternative arrangement, applicable in line-of-sight communication systems where the path loss would be the same from station A to B as from station B to A, becomes operative when switch 44 is connected to terminal "B" and switch 46 is connected to terminal "B" (all designated in FIG. 1). A local source of signals 60 is applied to transmitter 52 at station B for transmission to station A. If the intensity of the carrier radiated from station B is equal to that radiated from station A and identical antennas are employed, a signal representative of the carrier intensity at receiver 54 is taken, as in the case of receiver 20, from the receiver automatic gain control signal and applied through switches 46 and 48 to function generator 56. As before, function generator 56 produces a control signal which is applied to variable attenuator 12 to adjust the frequency deviation for optimum quality of transmission. This arrangement can be advantageously employed in a two-way transmission system in which local source 60 is a source of information to be conveyed to station A from station B. At receiver 54 the information signal then appears at terminal A of switch 46 and can be applied to an information load (not shown). The frequency deviation control scheme could be applied as well to the second transmission path including transmitter 52 and receiver 54.

Certain other arrangements are possible in limited applications where the path loss between station A and station B can be predicted ahead of time or is known from some other condition existing at both stations A and B. For example, if station A and station B are linked by a space satellite repeater orbiting about Earth, the satellite orbit parameters are known and the path loss between stations A and B via the repeater can be calculated. In this case, switches 42 and 48 connect the corresponding function generators to terminals "C" in FIG. 1. The instantaneous satellite orbit parameters are continually applied to a computer 62 at station A and the carrier intensity resulting at the receiver determined therefrom. Computer 62 solves the equation $$(P_R)_{db}=10\log\left[(G_1G_2P_T)-(4\pi)^3\frac{d_1^2(t)d_2{}^2(t)}{\lambda^2\sigma}\right]$$

where $P_R$ is the carrier power intercepted at the receiver, $G_1$ is the gain of transmitting antenna 16, $G_2$ is the gain of receiving antenna 18, $P_T$ is the carrier power radiated from the transmitter, $d_1(t)$ is the distance between station A and the satellite as a function of time, $d_2(t)$ is the distance between station B and the satellite as a function of time, λ is the wavelength of the signal transmitted from station A, and σ is the satellite reflective cross section assuming it to be passive. The calculation for path loss is discussed in detail in an article entitled "System Calculation" beginning at page 1029 of the Bell System Technical Journal, volume 40, No. 4, July 1961. Briefly, computer 62 corresponds to the general purpose digital computer to which reference is made at page 1036 of the above article and is programmed using conventional programming techniques to solve the equation given above. The signal representing the computer solution is applied, as in the prior cases, through switch 48 to function generator 56 which derives a control signal for adjusting variable attenuator 12. Likewise, the same instantaneous orbit parameters are applied to an identical computer 62 at station B and a signal representative of the carrier level at the receiver obtained which is applied to function generator 58. Alternatively, to obviate the necessity for computer 62 at station B the automatic gain control signal from lead 50 could be applied through terminal A of switch 42 to provide the input for function generator 58.

The satellite position, and therefore the path loss, can be determined as well from the directions in which the antennas at each station point. This antenna pointing information is applied to a computer 64 which derives a signal indicative of the carrier intensity at station B therefrom. This is applied through terminal "B" of switch 48 to function generator 56. At station B a similar computer 64 derives a signal indicative of the carrier intensity at the input of receiver 20 from pointing information of the antennas at station B for application to function generator 58.

Although the invention is illustrated in a radio communication system, it can be practiced in wire transmission as well. Variations in carrier intensity developed in transmission over wires are not generally as severe as in radio transmission, and therefore the present invention is more frequently justified in radio systems.

What is claimed is:

1. A frequency modulation communication system comprising a first station and a second station, a bilateral transmission path between said stations the loss introduced thereby being subject to variations, a transmitter and a receiver located at each of said stations and accessible to said transmission path, a first source of signals to be conveyed from said first station to said second station connected to the transmitter located at said first station, means for extracting said first signal from the receiver at said second station, a second source of signals to be conveyed from said second station to said first station connected to the transmitter at said second station, means available at said first station to extract said second signal at the receiver of said first station, means for deriving an indication of the carrier intensity at the input to said receiver at said first station, and means responsive to said indication for altering the frequency deviation of the frequency modulated signal generated by said transmitter at said first station to maintain equality between the signal-to-thermal noise ratio and the signal-to-modulation noise ratio at the output of said receiver at said second station.

2. In a communication system, a frequency modulation transmitter, a frequency modulation receiver subject to changes in physical distance from said transmitter in a predetermined manner, a first source of information to be conveyed from said transmitter to said receiver, means for applying said information to said transmitter, means for transmitting the output of said transmitter to said receiver, a second source of information of the physical distance between said transmitter and said receiver, said second source being located at said transmitter, and means for developing a control signal from said distance information indicative of the signal intensity at the input to said receiver, means responsive to said control signal for modifying the frequency deviation of the frequency modulated signal generated by said transmitter to maintain maximum signal-to-noise ratio at the output of said receiver as the physical distance between said transmitter and said receiver changes.

3. A frequency modulation communication system comprising a transmitter, a receiver, a transmission path between said transmitter and said receiver introducing varying loss, means for applying to said transmitter information to be conveyed to said receiver, means for sampling the signal at the input to said receiver, means for deriving a control signal from said sample representative of the intensity of said signal at the input to said receiver, means for transmitting said control signal to said transmitter, means responsive to said control signal for varying the frequency deviation of the frequency modulated signal generated by said transmitter to maintain maximum signal-to-noise ratio at the output of said receiver thereby compensating for the variations in path loss between said transmitter and said receiver, and means located at said receiver responsive directly to said control signal for varying the intensity of said information appearing at the output of said receiver in inverse relation to the control exerted upon the frequency deviation of said frequency modulation signal at said transmitter.

4. In a passive satellite communication system, a frequency modulation receiver, a frequency modulation transmitter communicating with said receiver via said satellite, a source of information to be conveyed from said transmitter to said receiver, means for applying said information to said transmitter, a first source of signals located at said transmitter representing the predicted distance $d_1(t)$ between said transmitter and said satellite, a second source of signals located at said transmitter representing the predicted distance $d_2(t)$ between said satellite and said receiver, means located at said transmitter for solving the equation $$10 \log \left[ (G_1 G_2 P_T) - (4\pi)^3 \frac{d_1{}^2(t) d_2{}^2(t)}{\lambda^2 \sigma} \right]$$

and deriving a signal representing the solution to said equation simulating the carrier intensity at the input of said receiver, where $G_1$ is the gain of the antenna of said transmitter, $G_2$ is the gain of the antenna of said receiver, $P_T$ is the signal power radiated from said transmitter, λ is the wavelength of the signal radiated from said transmitter, and σ is the reflective cross section of said satellite, means for coupling said first and second sources of signals to said solving means, and means responsive to said simulating signal for adjusting the frequency deviation of the frequency modulated signal generated by said transmitter to maintain maximum signal-to-noise ratio at the output of said receiver as the satellite parameters $d_1(t)$ and $d_2(t)$ vary.

References Cited by the Examiner

UNITED STATES PATENTS

| | | | |
|---|---|---|---|
| 2,410,489 | 11/46 | Fitch | 325—46 |
| 2,672,589 | 3/54 | McLeod | 332—18 |
| 2,912,569 | 11/59 | Shepherd | 325—45 |

DAVID G. REDINBAUGH, *Primary Examiner.*